(12) United States Patent
Nakayama et al.

(10) Patent No.: US 12,429,150 B2
(45) Date of Patent: Sep. 30, 2025

(54) TUBE BODY INTERMEDIATE

(71) Applicant: Hitachi Astemo, Ltd., Ibaraki (JP)

(72) Inventors: Takahiro Nakayama, Ibaraki (JP); Kenichi Mori, Ibaraki (JP); Kazuki Ohta, Ibaraki (JP)

(73) Assignee: Hitachi Astemo, Ltd., Ibaraki (JP)

( * ) Notice: Subject to any disclaimer, the term of this patent is extended or adjusted under 35 U.S.C. 154(b) by 369 days.

(21) Appl. No.: 17/884,072

(22) Filed: Aug. 9, 2022

(65) Prior Publication Data

US 2022/0381372 A1 Dec. 1, 2022

Related U.S. Application Data

(63) Continuation of application No. PCT/JP2020/012537, filed on Mar. 19, 2020.

(51) Int. Cl.
*F16L 9/12* (2006.01)
*B29C 63/00* (2006.01)
(Continued)

(52) U.S. Cl.
CPC .......... *F16L 9/123* (2013.01); *B29C 63/0073* (2013.01); *B29C 63/42* (2013.01);
(Continued)

(58) Field of Classification Search
CPC .................................................. F16L 11/00
(Continued)

(56) References Cited

U.S. PATENT DOCUMENTS 3,491,799 A * 1/1970 Foll ..................... B29C 61/0616
138/144
3,506,515 A * 4/1970 Hornor .................. C08G 18/00
156/173
(Continued)

FOREIGN PATENT DOCUMENTS

CN 104136201 A 11/2014
DE 112016005932 T5 10/2018
(Continued)

OTHER PUBLICATIONS

Japanese Office Action for the related Japanese Patent Application No. 2022-508018 dated Jan. 31, 2023.
(Continued)

*Primary Examiner* — David R Deal
(74) *Attorney, Agent, or Firm* — KENEALY VAIDYA LLP

(57) ABSTRACT

Provided is a tube body intermediate including: a carbon fiber disposed with respect to an outer circumferential surface of a mandrel so as to extend in an axial direction of the mandrel; and a fixing member having a tubular shape and disposed with respect to the outer circumferential surface of the mandrel so as to cover the carbon fiber. Also provided is a tube body production method including: disposing a fiber body with respect to an outer circumferential surface of a mandrel so that the fiber body extends in an axial direction of the mandrel; disposing a fixing member with a tubular shape with respect to the outer circumferential surface of the mandrel so that the fixing member covers the fiber body; and impregnating the fiber body with a resin on the outer circumferential surface of the mandrel and then heating the resin to mold the resin.

6 Claims, 8 Drawing Sheets

(51) Int. Cl.
  *B29C 63/42* (2006.01)
  *B29L 23/00* (2006.01)
  *B29K 105/02* (2006.01)
  *B29K 307/04* (2006.01)
(52) U.S. Cl.
  CPC ...... *B29K 2105/02* (2013.01); *B29K 2307/04* (2013.01); *B29L 2023/22* (2013.01)
(58) Field of Classification Search
  USPC .............................. 138/123–126, 137, 141
  See application file for complete search history.

(56) References Cited

U.S. PATENT DOCUMENTS

| | | | | |
|---|---|---|---|---|
| 4,153,747 | A | * | 5/1979 | Young ................ C09J 7/30 138/155 |
| 4,771,518 | A | * | 9/1988 | LaPointe ............. B64G 6/00 28/165 |
| 8,047,237 | B2 | * | 11/2011 | Limas ............... B29C 70/086 138/123 |
| 2015/0034233 | A1 | | 2/2015 | Hatta et al. |
| 2018/0283609 | A1 | | 10/2018 | Teruhira et al. |

FOREIGN PATENT DOCUMENTS

| | | |
|---|---|---|
| JP | S45-18031 Y1 | 7/1970 |
| JP | S51-137769 A | 11/1976 |
| JP | H03-265738 A | 11/1991 |
| JP | H08-187797 A | 7/1996 |
| JP | H08-205650 A | 8/1996 |
| JP | 2015-145104 A | 8/2015 |
| WO | 2021/186735 A1 | 9/2021 |

OTHER PUBLICATIONS

International Search Report and Written Opinion of the International Search Report for PCT/JP2020/012537 dated Jun. 2, 2020.
Chinese Office Action for the related Chinese Patent Application No. 202080094545.7 dated Jun. 29, 2023.
German Office Action for the related German Patent Application No. 112020006107.8 dated May 8, 2025.

* cited by examiner

TUBE BODY INTERMEDIATE

CROSS-REFERENCE TO RELATED APPLICATIONS

This application is a PCT Bypass application and claims priority under 35 U.S.C. § 120 to PCT application no. PCT/JP2020/012537 filed on Mar. 19, 2020, the disclosure of which is hereby incorporated by reference in its entirety.

TECHNICAL FIELD

The present invention relates to an intermediate of a tube body which is, for example, used as a power transmission shaft of a vehicle and to a method of producing a tube body.

BACKGROUND ART

Power transmission shafts (propeller shafts) mounted on vehicles each include a tube body extending in the front-rear direction of the vehicle. The tube body transmits power generated by a power plant and decelerated by a transmission to a final reduction gear unit. There is known a tube body made of a fiber reinforced plastic and produced using a mandrel, as a tube body used for such a power transmission shaft (see Japanese Patent Publication No. H03-265738 A).

SUMMARY OF THE INVENTION

Problems to be Solved by the Invention

Known techniques for winding a material over a mandrel includes the filament winding technique, which involves winding a continuous fiber impregnated with a resin, and the sheet winding technique, which involves winding a prepreg (a sheet made by impregnating a fiber material with a resin). The filament winding technique is advantageous for low-cost production but has difficulty in aligning a fiber material along the axial direction of a mandrel, in other words, aligning a fiber material along the axial direction of the tube body. On the other hand, the sheet winding technique allows aligning a fiber material along the axial direction of a mandrel but is disadvantageous in terms of production cost.

Here, assume that L represents the axial direction length over which fibers are disposed over a mandrel, r represents the radius of the outer circumferential surface of the mandrel, and θ represents the orientation angle of the fibers with respect to the mandrel (see FIG. 1). When the orientation angle θ is small such that $\tan\theta < |2\pi r/L|$, the fiber fails to be wound around the mandrel by one or more turns, in which case gravity can cause the fibers to separate from the mandrel.

The present invention is made to resolve such a problem, and it is an object of the present invention to provide a tube body intermediate and a tube body production method with which it is possible to, while reducing the production cost, reduce displacement of a fiber body even when the orientation angle of the fiber body is small.

Means for Solving the Problems

To resolve the above-described problems, a tube body intermediate of the present invention includes: a fiber body disposed with respect to an outer circumferential surface of a mandrel so as to extend in an axial direction of the mandrel; and a fixing member with a tubular shape, the fixing member disposed with respect to the outer circumferential surface of the mandrel so as to cover the fiber body.

Moreover, a tube body production method of the present invention includes: a disposing step of disposing a fiber body with respect to an outer circumferential surface of a mandrel so that the fiber body extends in an axial direction of the mandrel; a fixation step of disposing a fixing member with a tubular shape with respect to the outer circumferential surface of the mandrel so that the fixing member covers the fiber body; and a molding step of impregnating the fiber body with a resin on the outer circumferential surface of the mandrel and then heating the resin to mold the resin.

MODES FOR CARRYING OUT THE INVENTION

Figure 8:
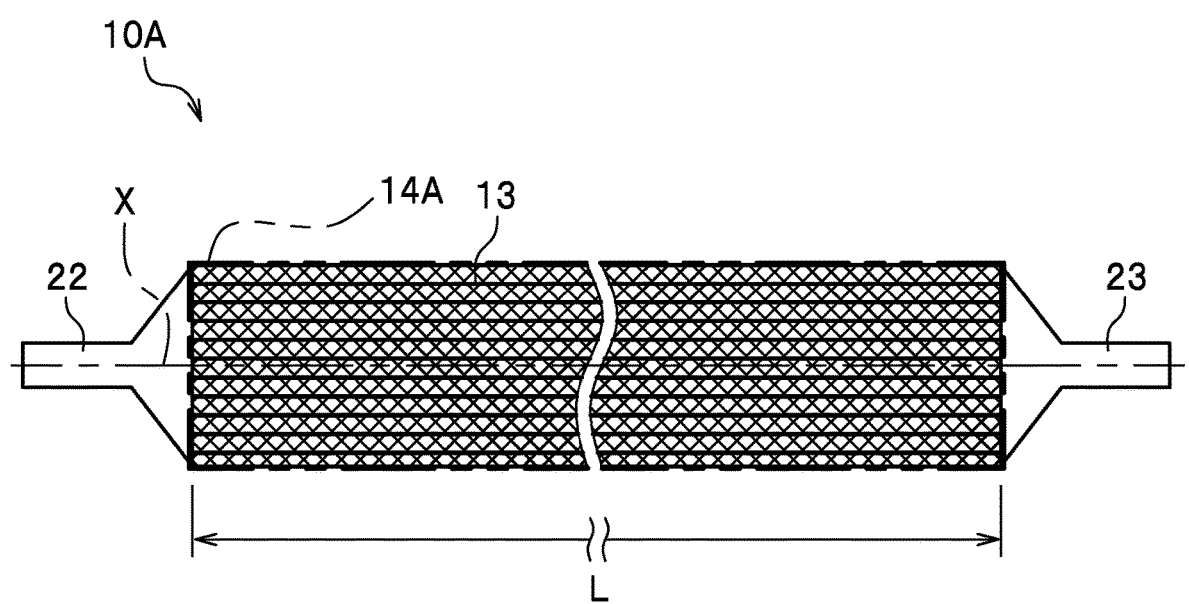
FIG. 8 is a diagram schematically illustrating an example of the tube body according to the first embodiment of the present invention.

An embodiment of the present invention will be described in detail with reference to the drawings, taking an exemplary case of producing a power transmission shaft (propeller shaft) of a vehicle as a tube body using a carbon fiber reinforced plastic. In the descriptions given below, the same elements are denoted by the same reference signs, and overlapping descriptions will be omitted. The drawings referenced in the description are depicted in a deformed manner for ease of understanding such that the dimensions of the members (e.g., shape or the like of the joints 22 and 23 illustrated in FIGS. 5 and 8) are not represented accurately.

First Embodiment

Figure 1A:
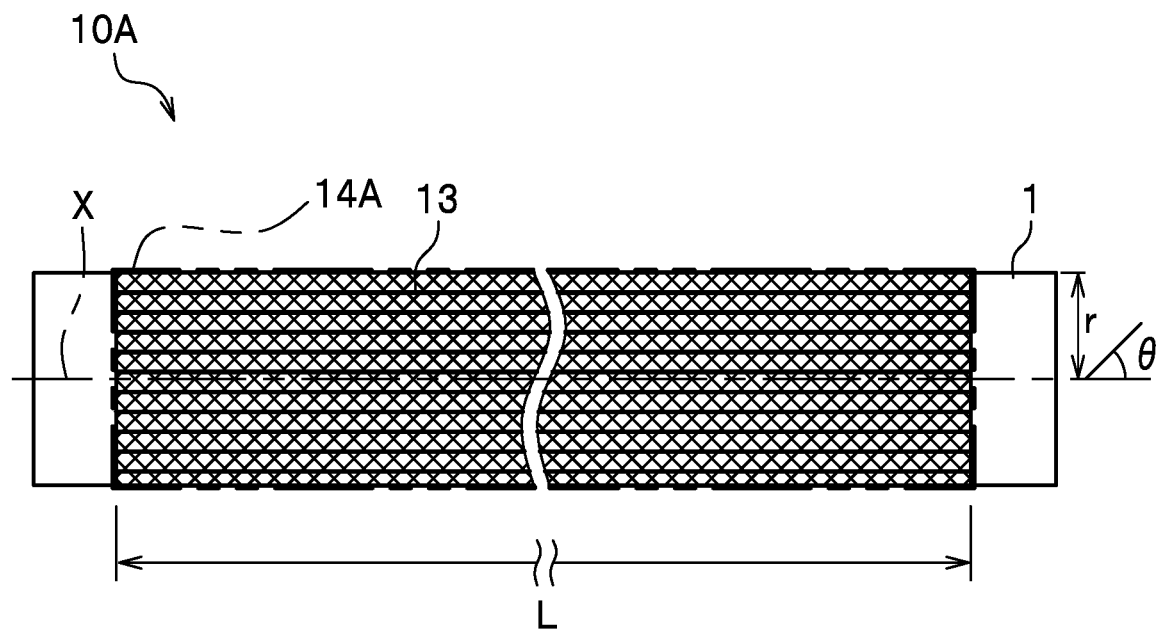
FIG. 1A is a diagram schematically illustrating a tube body intermediate according to a first embodiment of the present invention.
Figure 2:
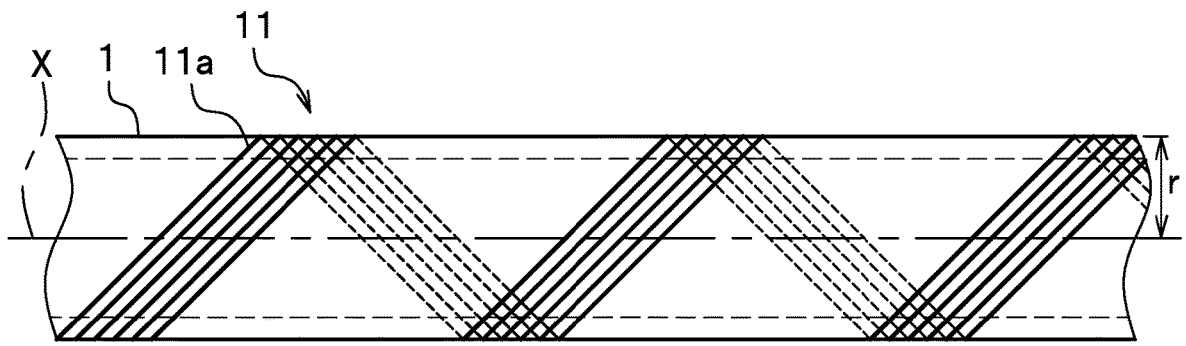
FIG. 2 is a diagram schematically illustrating a mandrel according to the first embodiment of the present invention and a first carbon fiber layer of the tube body intermediate according to the first embodiment of the present invention.

The tube body intermediate 10A illustrated in FIG. 1A is formed by disposing carbon fiber layers on the outer circumferential surface of a mandrel 1 (see FIG. 2). As illustrated in FIG. 2, the mandrel 1 is a metal member having a circular cylindrical tube shape.

<Tube Body Intermediate>

Figure 6:
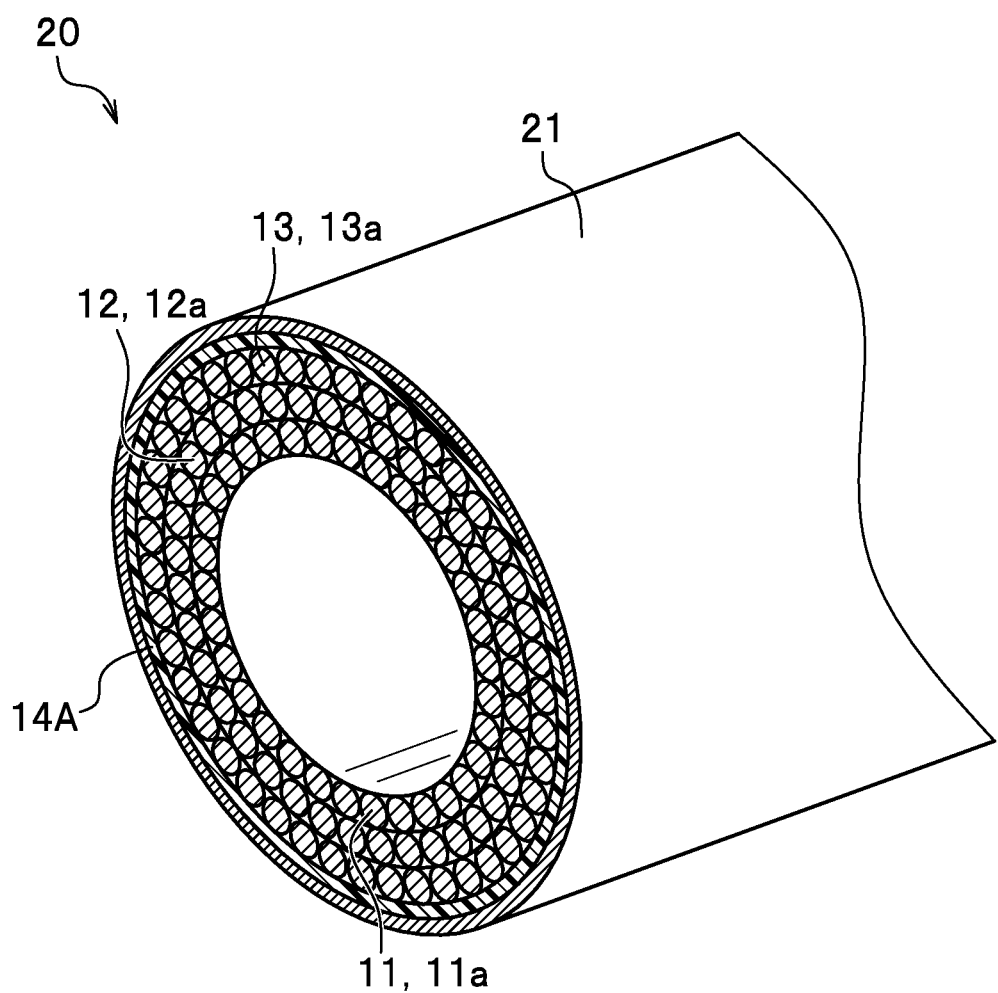
FIG. 6 is a diagram schematically illustrating a tube body produced using the tube body intermediate according to the first embodiment of the present invention.

As illustrated in FIG. 1A, the tube body intermediate 10A according to the first embodiment of the present invention is a circular cylindrical tube member which has a plurality of carbon fiber layers stacked one above the other and which is formed in the middle of producing a tube body 20 (see FIG. 6) described later. The tube body intermediate 10A includes, in order from the radially inner side (from the mandrel 1 side), a first carbon fiber layer 11 (see FIG. 2), a second carbon fiber layer 12 (see FIG. 3), and a third carbon fiber layer 13 (see FIG. 4). The tube body intermediate 10A further includes a fixing member 14A as a member for fixing the third carbon fiber layer 13. Note that, FIGS. 2 to 4 only partially illustrate the carbon fiber layers 11, 12, and 13.

<<First Carbon Fiber Layer>>

As illustrated in FIG. 2, the first carbon fiber layer 11 is constituted by a plurality of carbon fibers 11a disposed with respect to the outer circumferential surface of the mandrel 1 so as to cover the mandrel 1. The carbon fibers 11a of the first carbon fiber layer 11 are disposed such that the carbon fibers 11a are wound by one or more turns so as to be inclined by 45 degrees with respect to the axial direction of the mandrel 1 and that the carbon fibers 11a extend helically with respect to the axial direction of the mandrel 1. In other words, the orientation angle θ of the carbon fibers 11a is 45 degrees with respect to the axis X of the mandrel 1.

<<Second Carbon Fiber Layer>>

Figure 3:
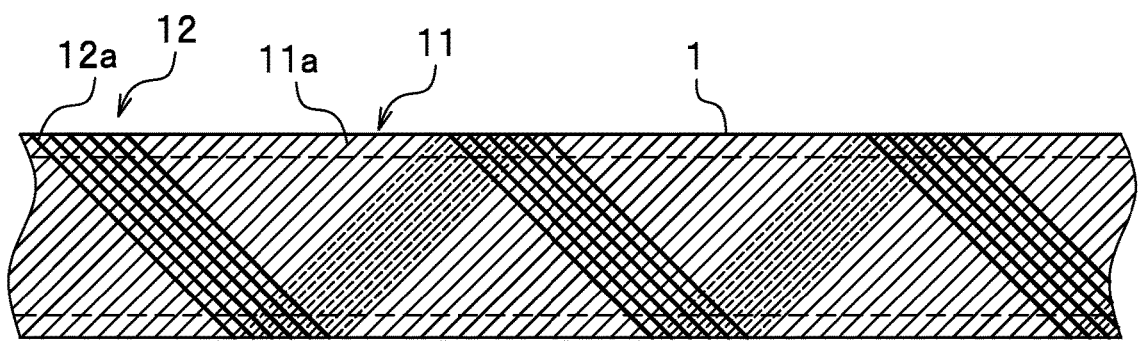
FIG. 3 is a diagram schematically illustrating a second carbon fiber layer of the tube body intermediate according to the first embodiment of the present invention.

As illustrated in FIG. 3, the second carbon fiber layer 12 is disposed on the radially outer side of the first carbon fiber layer 11 and is constituted by a plurality of carbon fibers 12a disposed so as to cover the first carbon fiber layer 11. The carbon fibers 12a of the second carbon fiber layer 12 are disposed such that the carbon fibers 12a are wound by one or more turns so as to be inclined by −45 degrees with respect to the axial direction of the mandrel 1 and that the carbon fibers 12a extend helically with respect to the axial direction of the mandrel 1. In other words, the orientation angle θ of the carbon fibers 12a is −45 degrees with respect to the axis X of the mandrel 1.

<<Third Carbon Fiber Layer>>

Figure 4:
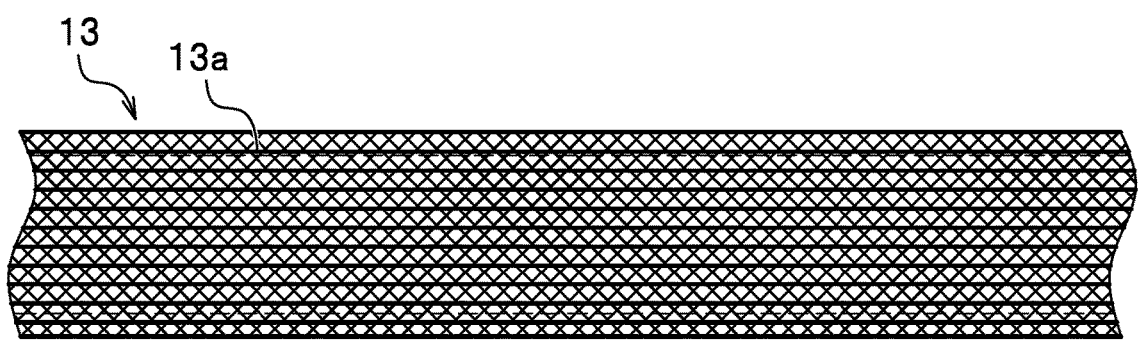
FIG. 4 is a diagram schematically illustrating a third carbon fiber layer of the tube body intermediate according to the first embodiment of the present invention.

As illustrated in FIG. 4, the third carbon fiber layer 13 is disposed on the radially outer side of the second carbon fiber layer 12 and is constituted by a plurality of carbon fibers 13a disposed so as to cover the second carbon fiber layer 12. The carbon fibers 13a of the third carbon fiber layer 13 are disposed to extend in parallel with the axial direction of the mandrel 1. In other words, the orientation angle θ of the carbon fibers 13a with respect to the axis X of the mandrel 1 is 0 degrees. The carbon fibers 13a has a length equal to an axial direction length L of the mandrel 1 excluding opposite end portions thereof to be held by devices.

<<Fixing Member>>

Figure 1B:
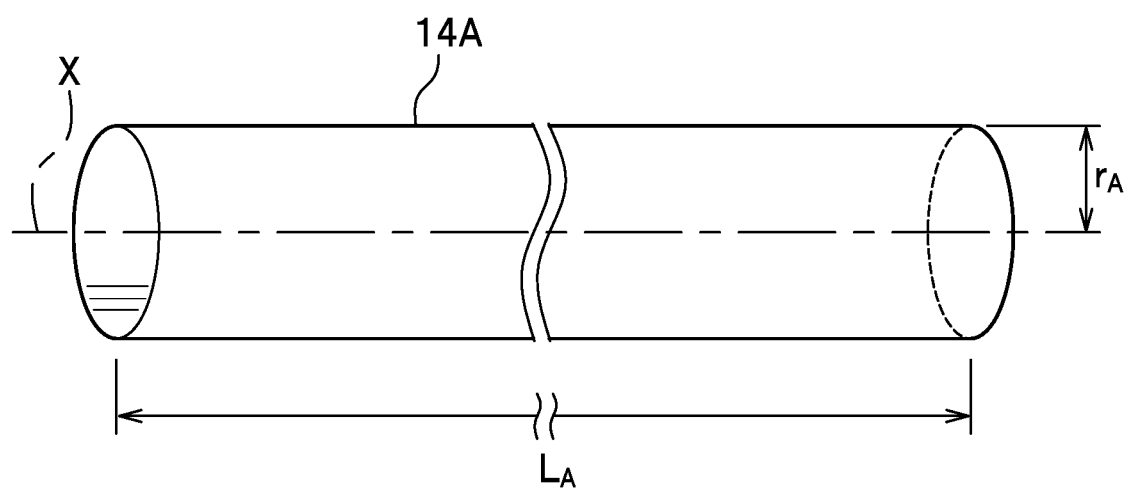
FIG. 1B is a diagram schematically illustrating a fixing member of the tube body intermediate.

As illustrated in FIGS. 1A and 1B, the fixing member 14A is a member configured to fix the third carbon fiber layer 13 on the outer circumferential surface of the mandrel 1. The fixing member 14A is a flexible resin member having a tubular shape (circular cylindrical tube shape). The fixing member 14A is formed of a heat shrink member, which shrinks when heat is applied. The fixing member 14A has an axial direction length $L_A$ approximately equal to the axial direction length L of the mandrel 1. The fixing member 14A has an inner diameter $r_A$ approximately equal to an outer diameter r of the mandrel 1. The fixing member 14A as described above is fitted over the mandrel 1 on which the carbon fiber layers 11, 12, and 13 are disposed. The fixing member 14A may have elasticity in the radial direction and may be fitted, in a state of being expanded in the radial direction, over the mandrel 1 on which the carbon fiber layers 11, 12, and 13 are disposed.

The first fixing member 14 as described above prevents the carbon fibers 13a, which are disposed on the outer circumferential surface of the mandrel 1 placed such that the axial direction thereof extends in the horizontal direction (i.e., which is disposed on the outer circumferential surface of the horizontally placed mandrel 1), from hanging down due to gravity. Specifically, the first fixing member 14 suitably prevents, of a portion of carbon fibers 13a located in a lower portion of the outer circumferential surface of the mandrel 1, an axial direction intermediate portion from hanging down due to gravity.

<Tube Body Production Method>

Figure 7:
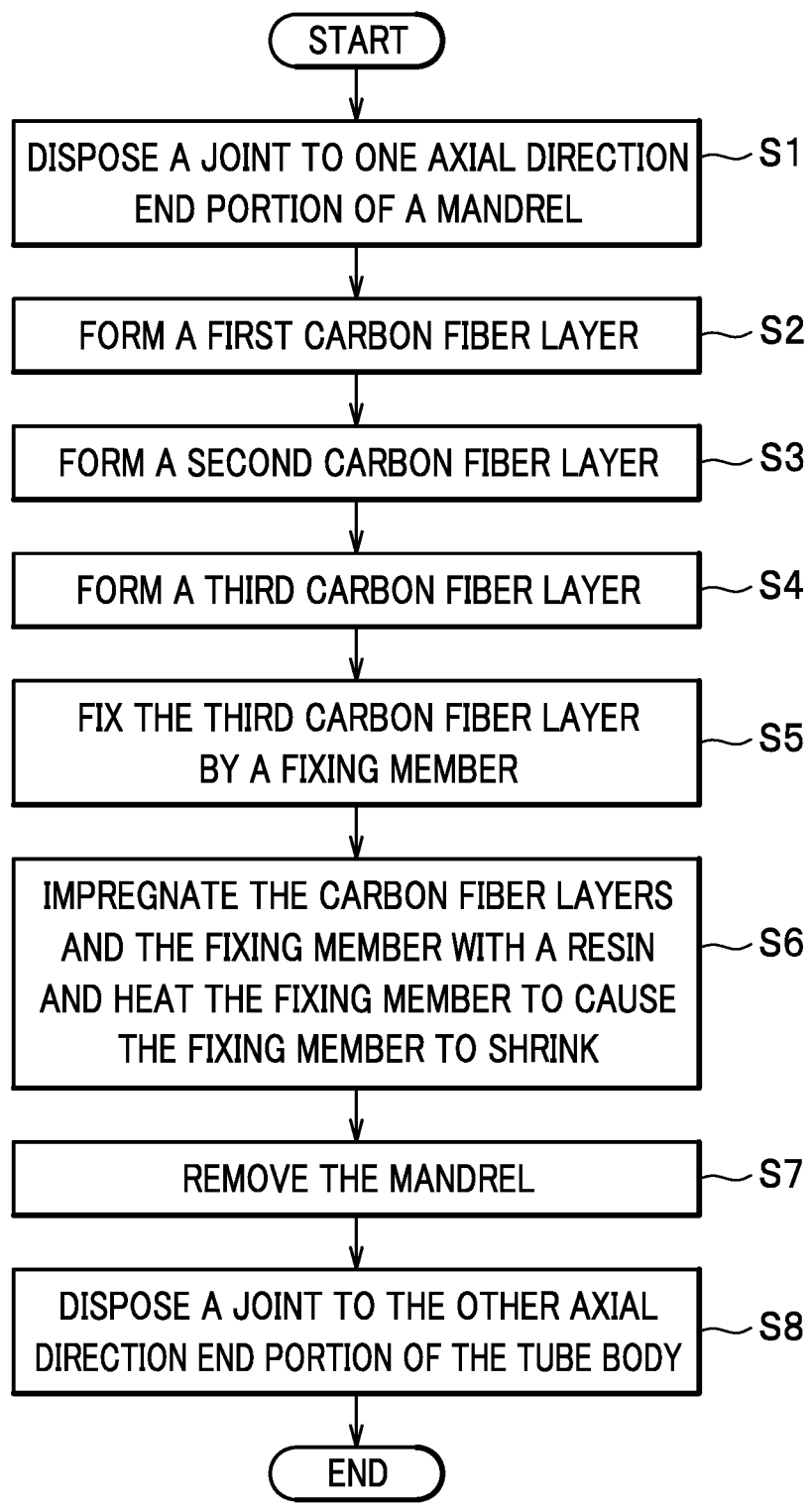
FIG. 7 is a flowchart illustrating a tube body production method according to the first embodiment of the present invention.

Subsequently, a description will be given of a method of producing a tube body via the tube body intermediate 10A according to the first embodiment, using the flowchart illustrated in FIG. 7.

Firstly, a joint (stub yoke or stub shaft) 22 (see FIG. 5) is disposed (step S1: Joint installation step) to one axial direction end portion of the mandrel 1. Subsequently, as illustrated in FIG. 2, the first carbon fiber layer 11 is formed (step S2: First carbon fiber layer forming step) on the outer circumferential surface of the mandrel 1 by a not-illustrated device. Subsequently, as illustrated in FIG. 3, the second carbon fiber layer 12 is formed (step S3: Second carbon fiber layer forming step) on the outer circumferential surface of the first carbon fiber layer 11 by a not-illustrated device. Subsequently, as illustrated in FIG. 4, the third carbon fiber layer 13 is formed (step S4: Third carbon fiber layer forming step/Disposing step) on the outer circumferential surface of the second carbon fiber layer 12 by a not-illustrated device.

Subsequently, as illustrated in FIG. 1A, by a not-illustrated device, the fixing member 14A is disposed on the outer circumferential surface of the third carbon fiber layer 13, thereby the third carbon fiber layer 13 is fixed (step S5: Fixation step) with respect to the mandrel 1.

The above-described steps from the first carbon fiber layer forming step to the fixation step can be said as a tube body intermediate production method configured to produce the tube body intermediate 10A.

Figure 5:
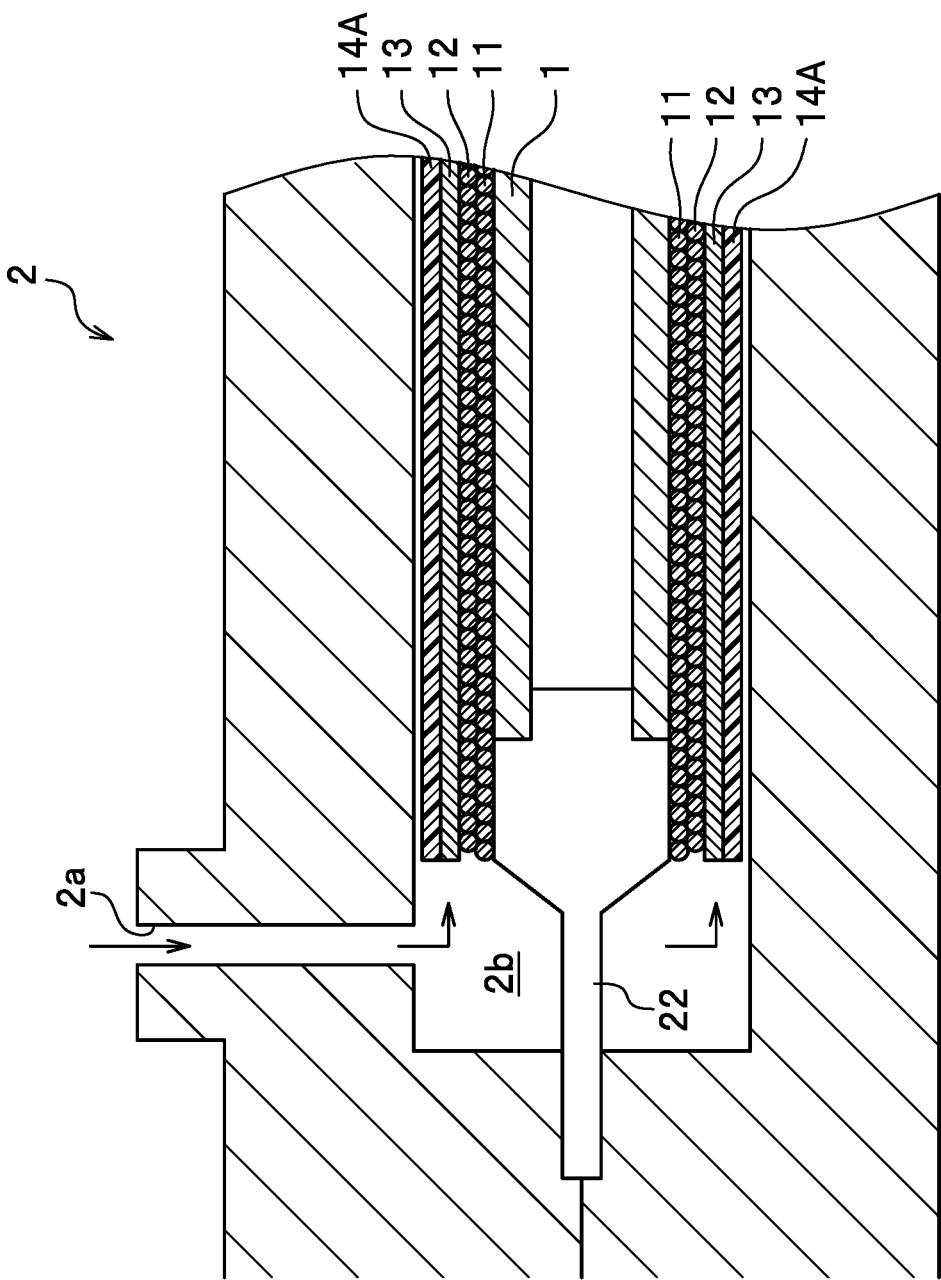
FIG. 5 is a diagram schematically illustrating a molding device for producing the tube body according to the first embodiment of the present invention.

Subsequently, as illustrated in FIG. 5, the first carbon fiber layer 11, the second carbon fiber layer 12, the third carbon fiber layer 13, and the fixing member 14A are impregnated with a resin 21 by a molding device (mold) 2. Then, heat is applied to the molding device 2 to mold (step S6: Molding step) the tube body 20. The resin 21 is, for example, a thermosetting resin. In the case of the present embodiment, the mold of the molding device 2 is divided into plural parts. In the molding step, while applying heat to the tube body intermediate 10A, after a mold closing operation that closes the mold of the molding device 2, a mold clamping operation that applies pressure to the closed mold is performed to increase the pressure in the mold, thereby to facilitate curing of the resin 21. Note that, as the present embodiment is described as using a mold having a plurality of parts, the mold closing operation and the mold clamping operation are described as being performed. However, the mold clamping operation is not necessarily mandatory. In addition, when the mold is not divided into a plurality of parts, such mold closing operation and mold clamping operation are not necessarily mandatory. In the example illustrated in FIG. 5, the joint (stub yoke or stub shaft) 22 is disposed to the one axial direction end portion of the mandrel 1, and the tube body intermediate 10A extends to an outer circumferential surface of the joint 22. Moreover, in the molding device 2, on the egress side of a gate 2a, through which the resin 21 in a molten state is to be injected, a space (resin reservoir 2b) is formed. The resin 21 injected into the molding device 2 moves via the resin reservoir 2b in the axial direction of the mandrel 1. The resin 21 as described above interpenetrates into the first carbon fiber layer 11, the second carbon fiber layer 12, and the third carbon fiber layer 13. The resin 21 also penetrates into between the third carbon fiber layer 13 and the fixing member 14A. In a state where the resin 21 has interpenetrated into the carbon fiber layers 11 to 13 and has penetrated into between the third carbon fiber layer 13 and the fixing member 14A, heat is applied to the molding device 2 and pressure is applied inside the molding device 2, thereby to form the tube body 20. In the molding step, the heat(s) of the molding device (mold divided into the plurality of parts) 2 and/or of the resin 21 causes the fixing member 14A to shrink (step S6: Shrinkage step) to become a protection layer that protects the carbon fiber layers 11, 12, and 13. Note that the resin 21 may be molded in a state of coating the fixing member 14A from the radially outer side thereof.

Subsequently, the molded tube body 20 and the mandrel 1 are taken out from the molding device 2 and then the mandrel 1 is pulled out (step S7: Core removal step) from the tube body 20. Subsequently, a joint (the other stub yoke or stub shaft) 23 (see FIG. 8) is attached (step S8: Joint attachment step) to the other axial direction end portion of the mandrel 1

The tube body intermediate 10A according to the first embodiment of the present invention includes: a fiber body (carbon fibers 13a) disposed with respect to the outer circumferential surface of the mandrel 1 so as to extend in the axial direction of the mandrel 1; and the fixing member 14A with a tubular shape, disposed with respect to outer circumferential surface of the mandrel 1 so as to cover the fiber body.

The tube body production method according to the first embodiment of the present invention includes: a disposing step of disposing the fiber body (carbon fibers 13a) with respect to the outer circumferential surface of the mandrel 1 so that the fiber body extends in the axial direction of the mandrel 1; a fixation step of disposing the fixing member 14A with a tubular shape, which is configured to fix the fiber body with respect to the outer circumferential surface of the mandrel 1, with respect to the outer circumferential surface of the mandrel 1 so that the fixing member 14A covers the fiber body; and a molding step of impregnating the fiber body with a resin on the outer circumferential surface of the mandrel 1 and then heating the resin to mold the resin into a tubular shape.

Theses configurations make it possible to, while reducing the production cost, reduce displacement of the fiber body even when the orientation angle θ of the fiber body is small.

Moreover, the fixing member 14A included in the tube body intermediate 10A is formed of a heat shrink member, which shrinks when heat is applied.

The tube body production method includes a shrinkage step that heats the fixing member 14A using heats of the resin 21 and of the molding device 2, which heats are generated in the molding step, thereby to cause the fixing member 14A to shrink.

This configuration makes it possible to form a protection layer that protects the fiber body, by means of the fixing member 14A that reduces the displacement of the fiber body.

Moreover, the configuration makes it possible to cause the fixing member 14A to shrink at the same time as performing the molding step, leading to reduction of production steps compared to a case where the molding step and the shrinkage step are performed separately.

Second Embodiment

Subsequently, a description will be given of a tube body intermediate and a tube body production method according to a second embodiment of the present invention, while focusing on differences from the first embodiment.

Figure 9A:
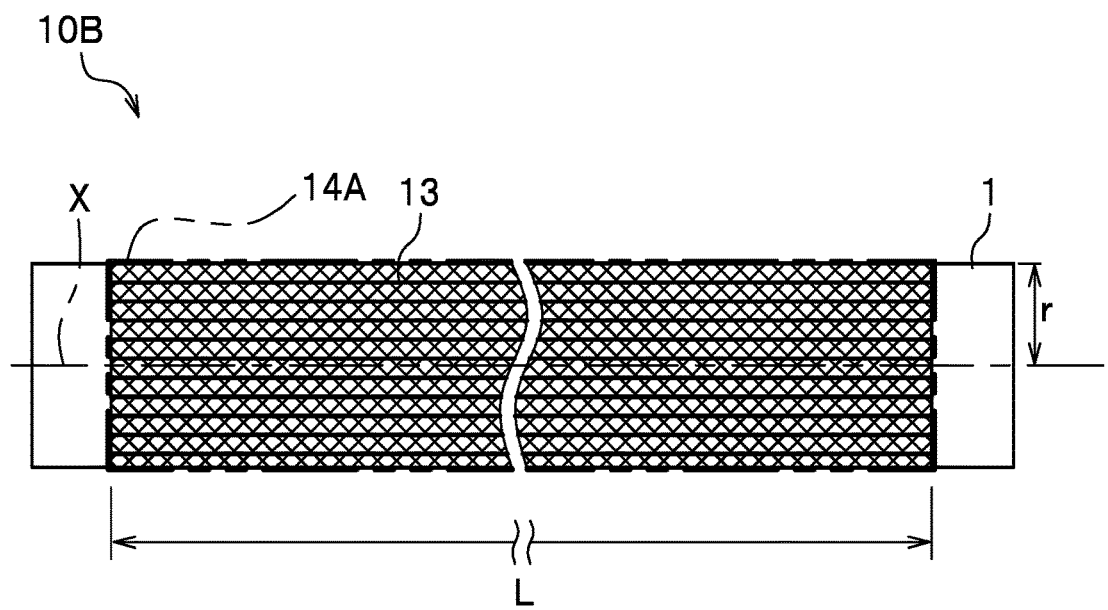
FIG. 9A is a diagram schematically illustrating a tube body intermediate according to a second embodiment of the present invention.
Figure 9B:
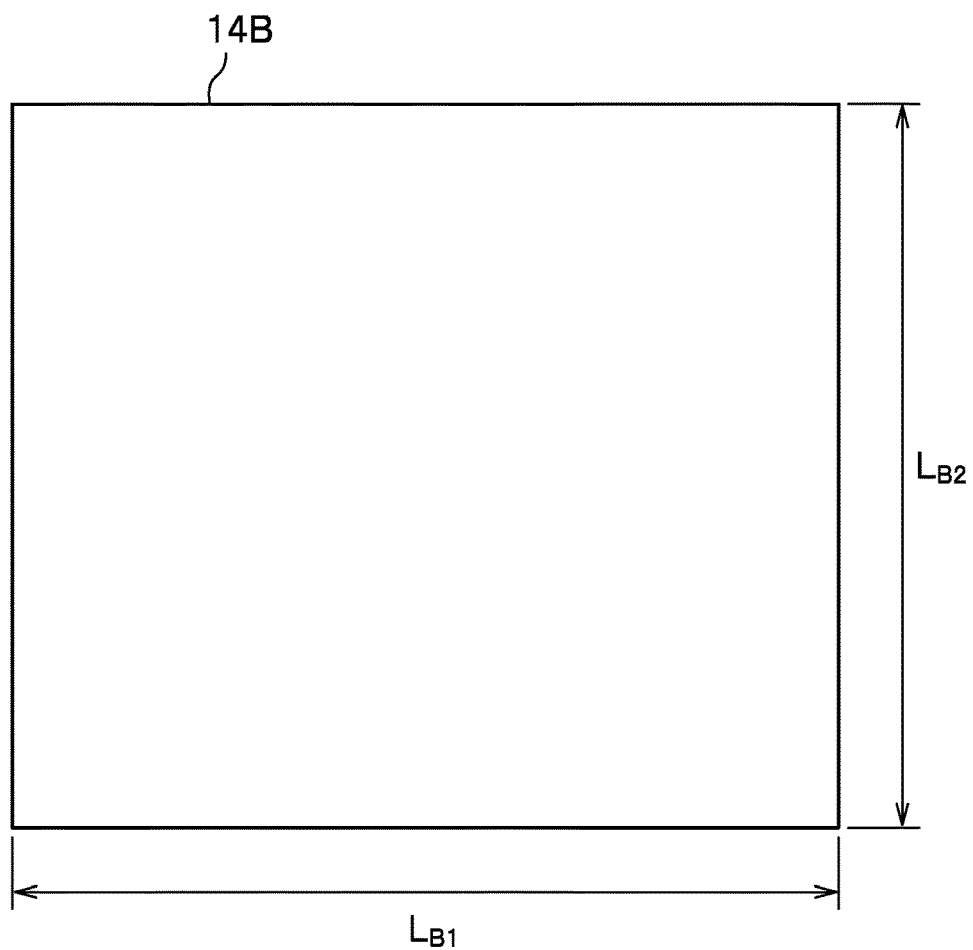
FIG. 9B is a diagram schematically illustrating a fixing member of the tube body intermediate according to a second embodiment of the present invention.

As illustrated in FIGS. 9A and 9B, a tube body intermediate 10B according to the second embodiment of the present invention includes a fixing member 14B in place of the fixing member 14A as a member for fixing the third carbon fiber layer 13

<<Fixing Member>>

The fixing member 14B is a film-like flexible resin member. The fixing member 14B is formed of a heat shrink member, which shrinks when heat is applied. The fixing member 14B has an axial direction length $L_{B1}$ approximately equal to the axial direction length L of the mandrel 1. The fixing member 14B has a dimension $L_{B2}$ in a direction perpendicular to the axial line of the fixing member 14B. This dimension is greater than the circumference $2\pi r$ of the outer circumferential surface of the mandrel 1. This fixing member 14B as described above is wound over the mandrel 1, on which the carbon fiber layers 11, 12, and 13 are disposed, by one or more turns.

<Tube Body Production Method>

Subsequently, a description will be given of a method of producing a tube body 20 via the tube body intermediate 10B according to the second embodiment.

In the fixation step (step S5), by a not-illustrated device, the first fixing member 14 is disposed on the outer circumferential surface of the third carbon fiber layer 13, thereby the third carbon fiber layer 13 is fixed with respect to the mandrel 1.

The fixing member 14B of the tube body intermediate 10B according to the second embodiment of the present invention is a film-like member wound in the circumferential direction by one or more turns.

This configuration makes it possible to dispose the fixing member 14B easily.

Third Embodiment

Subsequently, a description will be given of a tube body intermediate and a tube body production method according to a third embodiment of the present invention, while focusing on differences from the first embodiment.

Figure 10:
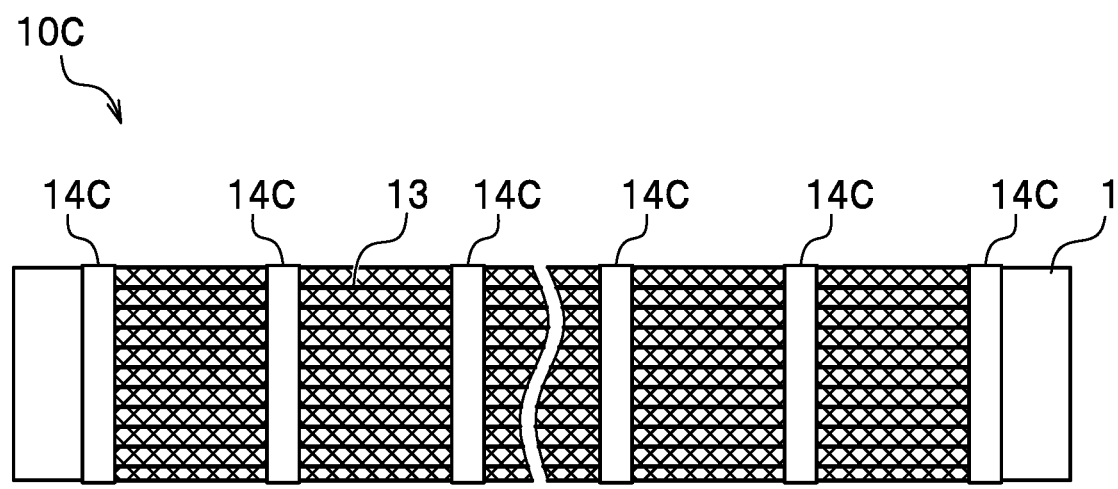
FIG. 10 is a diagram schematically illustrating a tube body intermediate according to a third embodiment of the present invention.

As illustrated in FIG. 10, a tube body intermediate 10C according to the third embodiment of the present invention includes a plurality of fixing members 14C in place of the fixing member 14A as a member for fixing the third carbon fiber layer 13.

<<Fixing Member>>

The fixing members 14C are each a flexible resin member having a tubular shape (circular cylindrical tube shape). The fixing members 14C are each formed of a heat shrink member, which shrinks when heat is applied. The fixing members 14C each have an axial direction length smaller than the axial direction length L of the mandrel 1. The fixing members 14C each have an inner diameter approximately equal to an outer diameter r of the mandrel 1. The plurality of fixing members 14C as described above are fitted over the mandrel 1 on which the carbon fiber layers 11, 12, and 13 are disposed, in a manner of being spaced apart at equal intervals. The plurality of fixing members 14C may have elasticity in the radial direction and may be fitted, in a state of being expanded in the radial direction, over the mandrel 1 on which the carbon fiber layers 11, 12, and 13 are disposed.

<Tube Body Production Method>

Subsequently, a description will be given of a method of producing a tube body 20 via the tube body intermediate 10C according to the third embodiment.

In the fixation step (step S5), by a not-illustrated device, the plurality of fixing members 14C are disposed on the outer circumferential surface of the third carbon fiber layer 13, thereby opposite end portions of the third carbon fiber layer 13 is fixed with respect to the mandrel 1.

The plurality of fixing members 14C of the tube body intermediate 10C according to the third embodiment of the present invention are disposed in a manner of being spaced apart with one another in the axial direction of the mandrel 1.

This configuration reduces the amount of the materials of the fixing members 14C and thus reduces the cost.

Although certain embodiments of the present invention have been described above, it is to be understood that the present invention is not limited only to the above-described embodiments and the embodiments of the present invention can be modified as appropriate within the range not departing from the gist of the invention. For example, the first carbon fiber layer 11 and the second carbon fiber layer 12 may be eliminated and the third carbon fiber layer 13 may be disposed directly on the outer surface of the mandrel 1. Moreover, the orientation angle of the carbon fibers 13a of the third carbon fiber layer 13 is not limited to 0 degrees (not limited to being in parallel to the axial direction of the mandrel 1), but may be an angle such that the carbon fibers 13a are wound by less than one turn with respect to the mandrel 1. In other words, the present invention is preferably applied when the orientation angle θ of the carbon fibers 13a satisfies $\tan\theta < |2\pi r/L|$. Moreover, the fiber bodies used in the tube body intermediates 10A to 10C are not limited to the carbon fibers 11a to 13a and may be other materials capable of reinforcing the tube body 20. Moreover, a curing step that, using a heat source other than the molding device 2 and the resin 21, applies heat to the fixing member 14A, 14B, or 14C formed of a heat shrink member to cause the member to be cured may be performed between the fixation step and the molding step.

Moreover, an axial direction end portion of the mandrel 1 may have a region where the carbon fiber layers 11, 12, and 13 are not disposed and the fixing member 14A or 14B may be configured to extend to the region. In this case, after the molding step, a portion of the resin 21 in which portion only the fixing member 14A or 14B is present but the carbon fiber layers 11, 12, and 13 are not present may be cut out.

What is claimed is:

1. A tube body intermediate comprising:
   a fiber body disposed with respect to an outer circumferential surface of a mandrel so as to extend in an axial direction of the mandrel; and
   a fixing member with a tubular shape, the fixing member disposed with respect to the outer circumferential surface of the mandrel so as to cover the fiber body,
   wherein an axial direction end portion of the mandrel has an exposed region where the fiber body is not disposed, and
   wherein the fixing member extends to the exposed region.

2. The tube body intermediate according to claim 1, wherein the fixing member is a film-like member wound in a circumferential direction by one or more turns.

3. The tube body intermediate according to claim 2, wherein the fixing member is formed of a heat shrink member, which shrinks when heat is applied.

4. The tube body intermediate according to claim 1, wherein the fixing member is formed of a heat shrink member, which shrinks when heat is applied.

5. A tube body intermediate comprising:
   a fiber body disposed with respect to an outer circumferential surface of a mandrel so as to extend in an axial direction of the mandrel; and
   a plurality of fixing members each with a tubular shape, the plurality of fixing members disposed with respect to the outer circumferential surface of the mandrel in a manner of being spaced apart in the axial direction of the mandrel so as to cover the fiber body,
   wherein an axial direction end portion of the mandrel has an exposed region where the fiber body is not disposed, and
   wherein at least one of the plurality of fixing members extends to the exposed region.

6. The tube body intermediate according to claim 5, wherein the plurality of fixing members are each formed of a heat shrink member, which shrinks when heat is applied.

* * * * *